US011187089B2

(12) United States Patent
Wondrasek et al.

(10) Patent No.: US 11,187,089 B2
(45) Date of Patent: *Nov. 30, 2021

(54) DAMPER STACKS FOR TURBOMACHINE ROTOR BLADES

(71) Applicant: General Electric Company, Schenectady, NY (US)

(72) Inventors: Michael Anthony Wondrasek, Greenville, SC (US); Brian Denver Potter, Greer, SC (US); Robert Alan Brittingham, Greer, SC (US)

(73) Assignee: General Electric Company, Schenectady, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/708,999

(22) Filed: Dec. 10, 2019

(65) Prior Publication Data

US 2021/0172325 A1 Jun. 10, 2021

(51) Int. Cl.
| | | |
|---|---|---|
| *F01D 5/26* | (2006.01) | |
| *F01D 5/22* | (2006.01) | |
| *F01D 11/00* | (2006.01) | |
| *F01D 5/16* | (2006.01) | |
| *F01D 5/30* | (2006.01) | |

(52) U.S. Cl.
CPC .............. *F01D 5/22* (2013.01); *F01D 11/006* (2013.01); *F01D 5/16* (2013.01); *F01D 5/26* (2013.01); *F01D 5/3007* (2013.01); *F05D 2220/323* (2013.01); *F05D 2240/30* (2013.01); *F05D 2240/80* (2013.01); *F05D 2260/96* (2013.01)

(58) Field of Classification Search
CPC . F01D 5/22; F01D 5/26; F01D 11/008; F01D 25/06; F05D 2220/323; F05D 2240/30; F05D 2260/96; F05D 2240/80
See application file for complete search history.

(56) References Cited

U.S. PATENT DOCUMENTS 2,999,669 A 9/1961 McGinnis
5,820,343 A * 10/1998 Kraft .......................... F01D 5/16
416/96 A (Continued)

FOREIGN PATENT DOCUMENTS

FR 981599 A 5/1951
JP 2014084676 A 5/2014
(Continued)

OTHER PUBLICATIONS

European Search Report Corresponding to Application No. 20209646 dated Apr. 20, 2021.

*Primary Examiner* — Woody A Lee, Jr.
*Assistant Examiner* — Brian Christopher Delrue
(74) *Attorney, Agent, or Firm* — Dority & Manning, P.A.

(57) ABSTRACT

Damper stacks, rotor blades, and turbomachines are provided. A rotor blade includes a main body including a shank and an airfoil extending radially outwardly from the shank. The rotor blade further includes a damping passage defined in the main body, the damping passage extending radially through the main body. The rotor blade further includes a damper stack disposed within the damping passage, the damper stack including a plurality of damper pins, each of the plurality of damper pins in contact with a neighboring damper pin.

20 Claims, 7 Drawing Sheets

(56) References Cited

U.S. PATENT DOCUMENTS

| | | | |
|---|---|---|---|
| 7,121,801 B2* | 10/2006 | Surace | F01D 5/16 |
| | | | 416/193 A |
| 8,066,479 B2* | 11/2011 | El-Aini | F01D 5/26 |
| | | | 416/1 |
| 8,267,662 B2 | 9/2012 | Patrick et al. | |
| 8,672,626 B2* | 3/2014 | Boy | F01D 5/26 |
| | | | 416/1 |
| 8,876,478 B2* | 11/2014 | Wassynger | F01D 5/22 |
| | | | 416/190 |
| 9,151,165 B2* | 10/2015 | Donnell | F01D 11/005 |
| 9,175,570 B2* | 11/2015 | Propheter-Hinckley | |
| | | | B22F 10/20 |
| 9,194,238 B2* | 11/2015 | Roberts, III | F01D 25/06 |
| 9,309,782 B2* | 4/2016 | Kareff | F01D 5/22 |
| 9,657,717 B2 | 5/2017 | Ollgaard et al. | |
| 10,385,701 B2* | 8/2019 | Kareff | F01D 5/22 |
| 10,443,408 B2* | 10/2019 | Kareff | F01D 5/22 |
| 2008/0181779 A1* | 7/2008 | Decardenas | F01D 5/22 |
| | | | 416/219 R |
| 2012/0121424 A1* | 5/2012 | Wassynger | F01D 5/22 |
| | | | 416/190 |
| 2014/0147276 A1* | 5/2014 | Roberts, III | F01D 5/3084 |
| | | | 416/135 |
| 2016/0326881 A1 | 11/2016 | Hartung | |
| 2017/0067347 A1* | 3/2017 | Kareff | F01D 5/22 |
| 2017/0067350 A1* | 3/2017 | Kareff | F01D 5/22 |

FOREIGN PATENT DOCUMENTS

| | | |
|---|---|---|
| JP | 2018/135803 A | 8/2018 |
| WO | WO2017123206 A1 | 7/2017 |

\* cited by examiner

DAMPER STACKS FOR TURBOMACHINE ROTOR BLADES

FIELD

The present disclosure relates generally to rotor blades for turbomachines and, more particularly, to damper stacks for use internally in rotor blades.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The compressor section and turbine section generally include a plurality of rotor blades, typically arranged in a plurality of stages. During engine operation, vibrations may be introduced into the rotor blades. For example, fluctuations in flow of the working fluid being compressed or the hot combustion gases or steam may cause the rotor blades to vibrate. One basic design consideration for turbomachine designers is to avoid or minimize resonance with natural frequencies of the rotor blades and the dynamic stresses produced by forced response and/or aero-elastic instabilities, thus controlling high cycle fatigue of the rotor blades.

In order to improve the high cycle fatigue life of a rotor blade, vibration dampers are typically provided below and/or between the platforms to frictionally dissipate vibratory energy and to reduce the corresponding amplitude of vibration during operation. The amount of vibrational energy that is removed by the vibration damper is a function of the dynamic weight of the vibration damper and the reaction loads.

Although known dampers may be largely adequate during typical operations, there is a desire to improve overall damper effectiveness. For example, the damping capabilities of such damper designs in many cases is limited to damping with respect to relative motion between neighboring rotor blades. Further, such damper designs are subject to wear during operation and may in many cases become ineffective after a period of time due to such wear.

Accordingly, improved damper designs are desired in the art. In particular, damper designs that provide damping of the absolute motion of a single rotor blade, regardless of the relative motion between neighboring blades, would be advantageous. Further, damper designs that continue to provide damping despite wearing during operation would be advantageous.

BRIEF DESCRIPTION

Aspects and advantages of the damper stacks, rotor blades, and turbomachines in accordance with the present disclosure will be set forth in part in the following description, or may be obvious from the description, or may be learned through practice of the technology.

In accordance with one embodiment, a rotor blade for a turbomachine is provided. The rotor blade includes a main body including a shank and an airfoil extending radially outwardly from the shank. The rotor blade further includes a damping passage defined in the main body, the damping passage extending radially through the main body. The rotor blade further includes a damper stack disposed within the damping passage, the damper stack including a plurality of damper pins, each of the plurality of damper pins in contact with a neighboring damper pin.

In accordance with another embodiment, a turbomachine is provided. The turbomachine includes a compressor section, a combustor section, a turbine section, and a plurality of rotor blades provided in at least one of the compressor section or the turbine section. Each of the plurality of rotor blades includes a main body including a shank and an airfoil extending radially outwardly from the shank. Each of the plurality of rotor blades further includes a damping passage defined in the main body, the damping passage extending radially through the main body. Each of the plurality of rotor blades further includes a damper stack disposed within the damping passage, the damper stack including a plurality of damper pins, each of the plurality of damper pins in contact with a neighboring damper pin.

These and other features, aspects and advantages of the present damper stacks, rotor blades, and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present damper stacks, rotor blades, and turbomachines, including the best mode of making and using the present systems and methods, directed to one of ordinary skill in the art, is set forth in the specification, which makes reference to the appended figures, in which.

DETAILED DESCRIPTION

Figure 1:
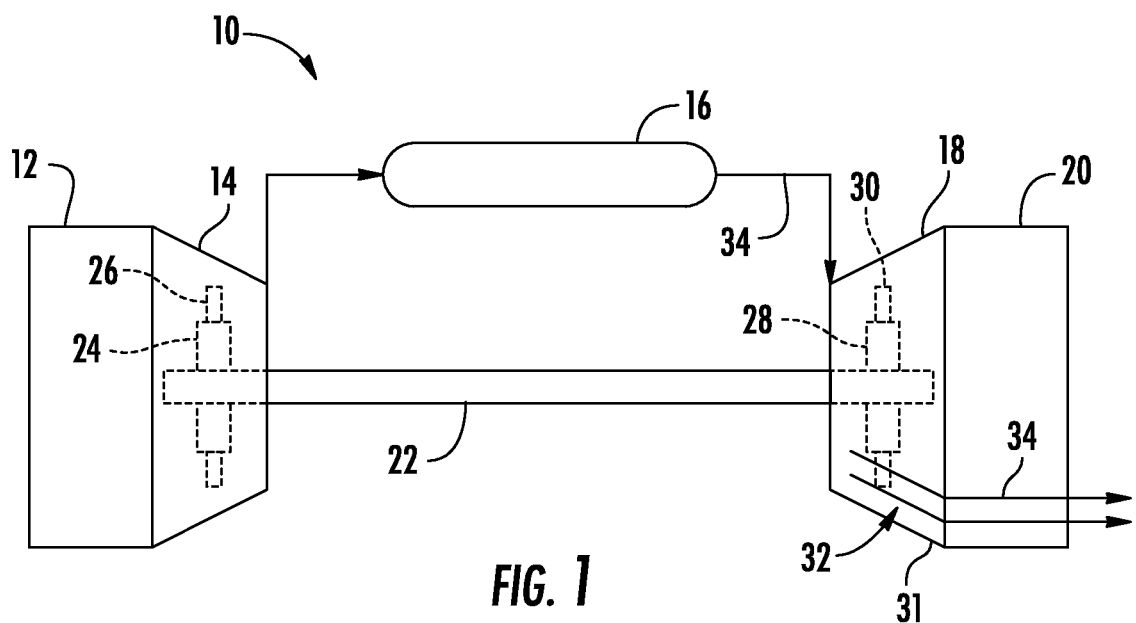
FIG. 1 illustrates schematic diagram of a turbomachine, in accordance with embodiments of the present disclosure.

Reference now will be made in detail to embodiments of the present damper stacks, rotor blades, and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including, but not limited to, a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, where energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
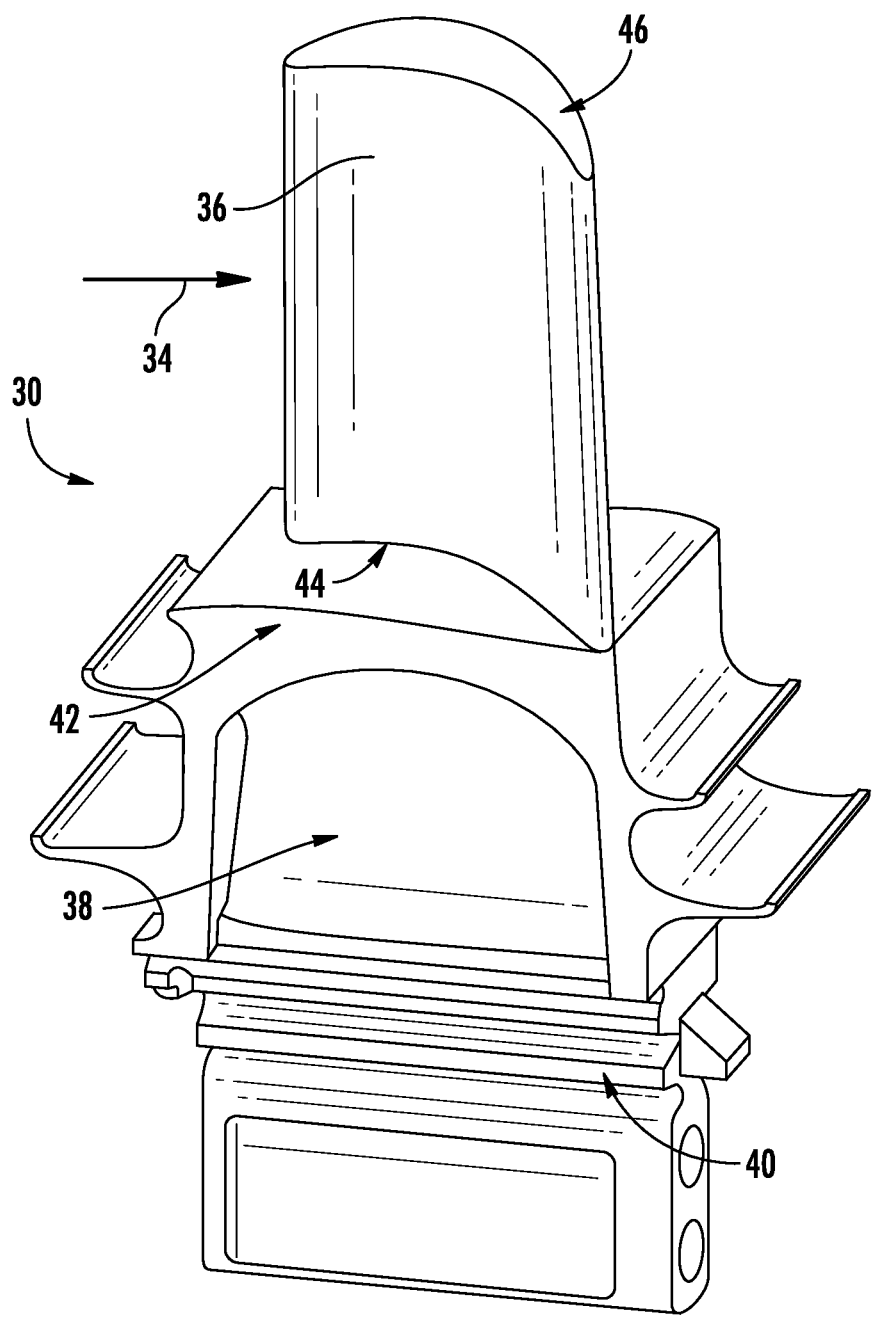
FIG. 2 illustrates a perspective view of a rotor blade, in accordance with embodiments of the present disclosure.

FIG. 2 illustrates one embodiment of a rotor blade in accordance with embodiments of the present disclosure. In the embodiment shown, the rotor blade is a turbine blade or bucket 30, although, in alternative embodiments, the rotor blade could be a compressor blade or bucket 26.

The rotor blade 30 may include a body which includes an airfoil 36 and a shank 38. The airfoil 36 may extend and be positioned radially outwardly from the shank 38. The shank 38 may include a root or dovetail 40, which may attach to the rotor disk 28 to facilitate rotation of the rotor blade 30.

The airfoil 36 may have a generally aerodynamic contour. For example, the airfoil 36 may have an exterior surface defining a pressure side and suction side each extending between a leading edge and a trailing edge. The exterior surface of the shank 38 may include a pressure side face, a suction side face, a leading edge face, and a trailing edge face.

A platform 42 may generally surround the main body. A typical platform may be positioned at an intersection or transition between the airfoil 36 and shank 38 and extend outwardly in the generally axial and tangential directions, as shown.

Figure 3:
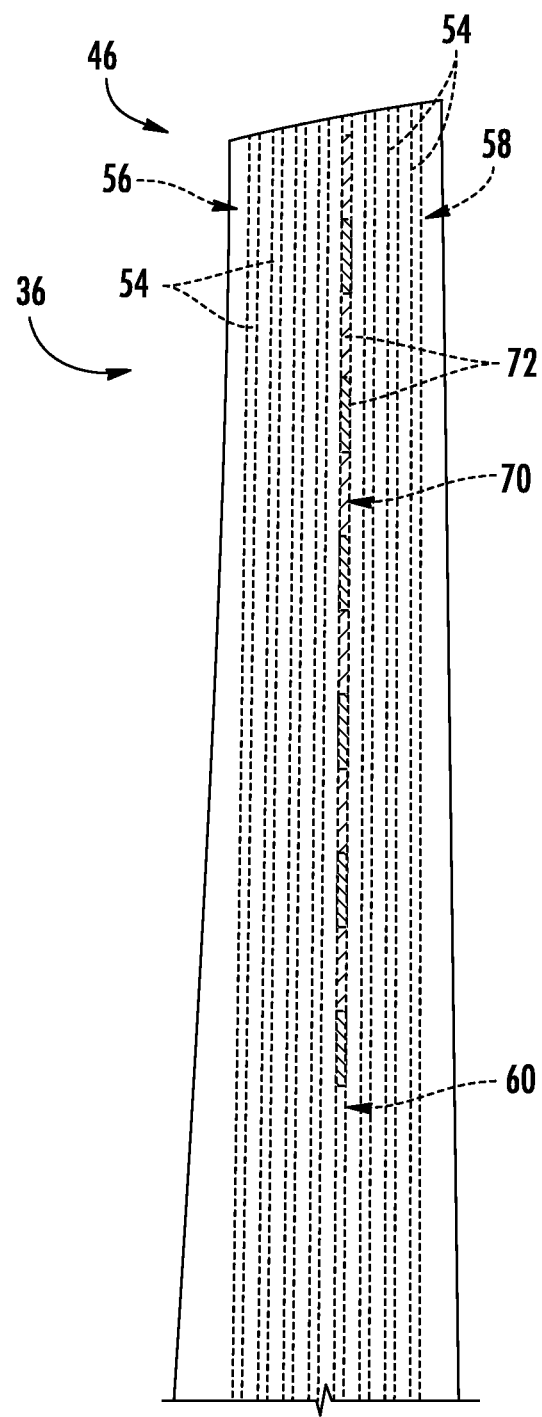
FIG. 3 is a cross-sectional view, generally along a tangential direction, of a portion of a rotor blade, in accordance with embodiments of the present disclosure.
Figure 4:
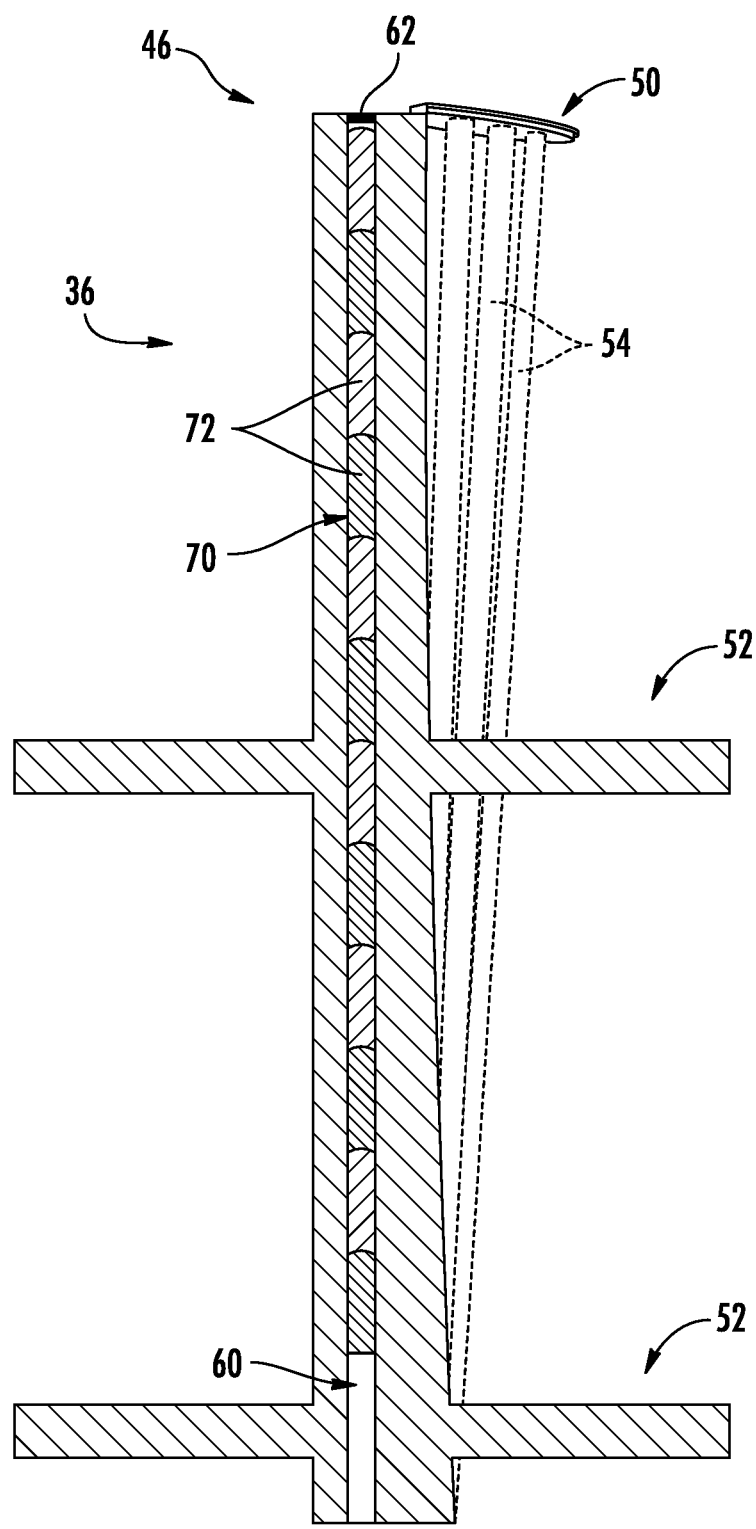
FIG. 4 is a cross-sectional view, generally along an axial direction, of a portion of a rotor blade, in accordance with embodiments of the present disclosure.

Referring now to FIGS. 3 and 4, rotor blade 30 may further include one or more shrouds. For example, the airfoil 36 may extend radially between a base 44 (at the intersection between the airfoil 36 and shank 38) and a tip 46. In some embodiments, a tip shroud 50 may be provided at the tip 46 and may extend outwardly from the airfoil 36 in the generally axial and tangential directions. In some embodiments, one or more mid-span shrouds 52 may be provided between the tip 46 and the base 44 and may extend outwardly from the airfoil 36 in the generally axial and tangential directions.

One or more cooling passages 54 may be defined in the main body, such as in the airfoil 36 as well as in the shank 38. Each cooling passage 54 may extend radially through the main body, such as through the airfoil 36 (as shown) and/or the shank 38. Additionally, one or more cooling passages 54 may be connected to form a cooling circuit. FIG. 3 illustrates a first cooling circuit 56 and a second cooling circuit 58, each of which includes a plurality of connected cooling passages 54. A cooling medium may be flowed through the cooling passages 54 to cool the main body and rotor blade 30 during operation.

Referring now to FIGS. 3 through 6, one or more damping passages 60 may be defined in and extend radially through the main body, such as in the airfoil 36 (as shown), as well as in the shank 38. In some embodiments, a damping passage 60 may be one of the cooling passages 54. In other embodiments, the damping passage 60 may be separate and independent from the cooling passages 54, such that cooling medium is not flowed through the damping passage 60.

Damping passage 60 may extend and be defined radially through the entire main body or only a portion thereof. For example, as discussed, at least a portion of (which may be the entire) damping passage 60 may extend and be defined through the airfoil 36. In some embodiments, as illustrated in FIG. 4, the portion of the damping passage 60 extending and defined through the airfoil 36 may extend from the base 44 through the tip 46. In other embodiments, as illustrated in FIG. 5, the damping passage 60 extends radially through only a portion of the airfoil 36 and does not extend to the tip 46.

In some embodiments, a plug 62 may be provided and disposed within the damping passage 60 at the tip 46 or at another location in the damping passage 60. The plug 62 may, for example, be brazed, welded, threadably engaged, or otherwise fastened in place at the tip 46 or at another location in the damping passage 60. In embodiments wherein the damping passage 60 extends through the tip 46, the plug 62 may be provided such that the damping passage 60 is not open externally to the rotor blade 30.

Figure 5:
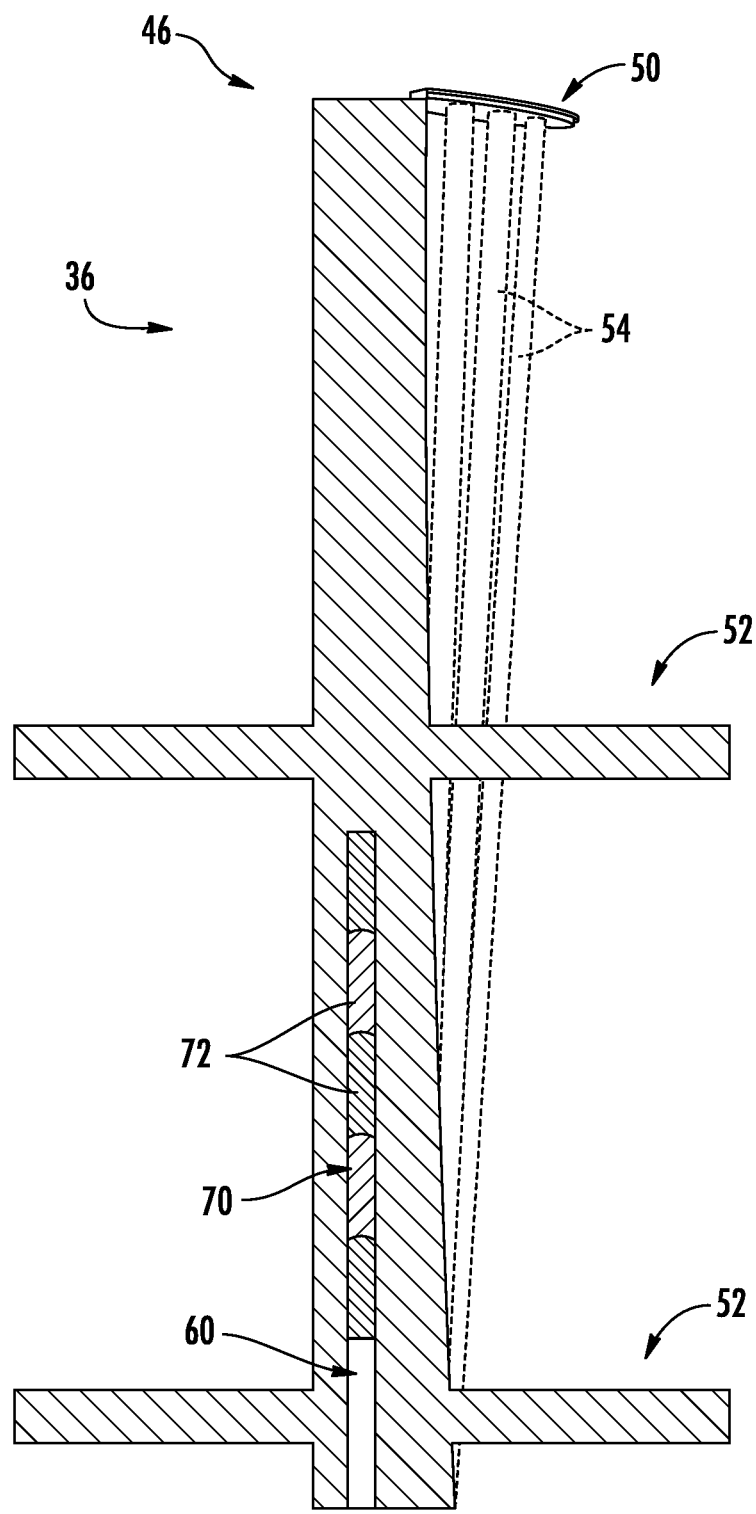
FIG. 5 is a cross-sectional view, generally along an axial direction, of a portion of a rotor blade, in accordance with other embodiments of the present disclosure.
Figure 6:
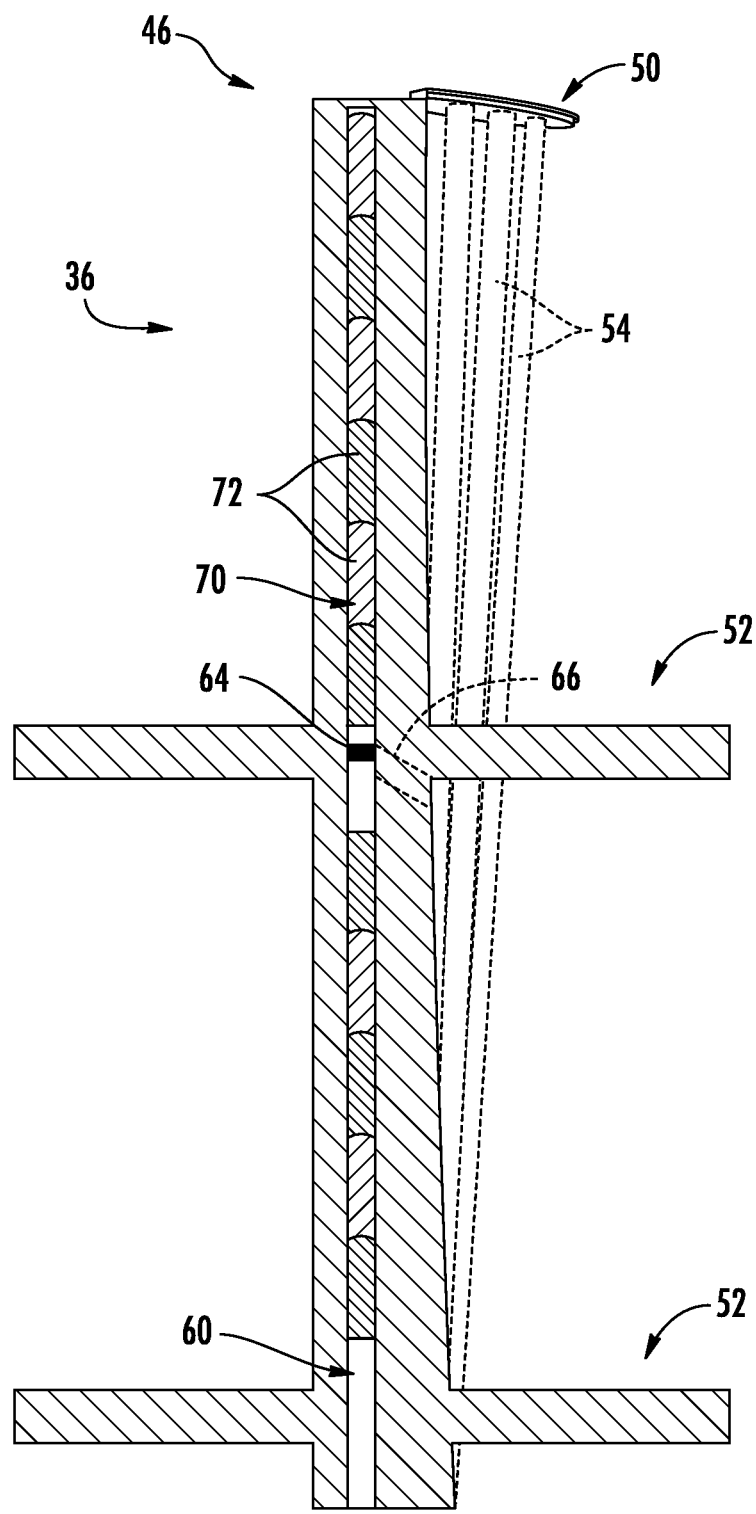
FIG. 6 is a cross-sectional view, generally along an axial direction, of a portion of a rotor blade, in accordance with still other embodiments of the present disclosure.
Figure 7:
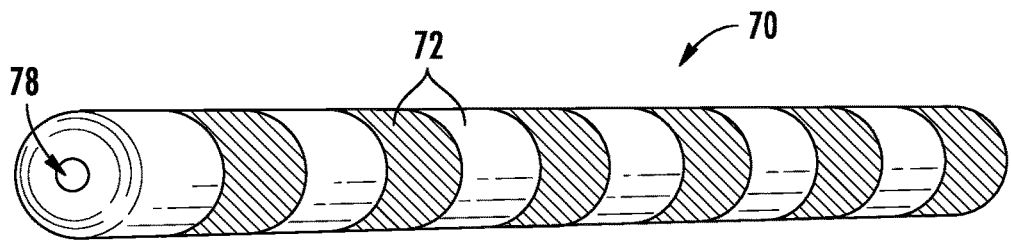
FIG. 7 is a perspective view of a damper stack, in accordance with embodiments of the present disclosure.

In some embodiments, as illustrated in FIGS. 4 and 5, the damping passage 60 is a single, unimpeded passageway. In other embodiments, as illustrated in FIG. 6, the damping passage 60 may be segmented into one or more passage segments. This may allow for multiple independent damper stacks 70 (as discussed herein) to be utilized in a given damping passage 60. For example, a static insert 64 may be disposed within the damping passage 60. The static insert 64 may be provided in the damping passage 60 during casting or other formation of the rotor blade 30 or may be inserted into the damping passage 60 after formation of the rotor blade 30, such as by drilling an access hole 66 into the rotor blade 30 and inserting the static insert 64 through the access hole 66 into the damping passage 60. In some embodiments, the access hole 66 may be formed at least partially through the mid-span shroud 52.

Referring now to FIGS. 3 through 10, one or more damper stacks 70 may be provided in a rotor blade 30 in accordance with the present disclosure. Each damper stack 70 may be disposed within a damping passage 60. Each damper stack 70 may include a plurality of damper pins 72. Each damper pin 72 may be in contact with a neighboring damper pin 72 in the damper stack 70 and may further be in contact with walls defining the damping passage 60.

The use of damper stacks 70 in accordance with the present disclosure advantageously provides improved damping of rotor blades 30 in accordance with the present disclosure. For example, by providing such damper stacks 70 internally in individual rotor blades 30, the damper stacks 70 operate to dampen the absolute motion of the individual rotor blades 30 regardless of the relative motion between neighboring blades. Such damper stacks 70 can, for example, advantageously dampen the absolute vibratory and/or bending motion of individual rotor blades 30.

Further, as discussed, damper stacks 70 in accordance with the present disclosure advantageously include a plurality of damper pins 72 arranged end-to-end in a co-axial relationship with a longitudinal axis of the damping passage 60. The primary damping of damper stacks 70 is due to the contact between the pins 72 of the damper stack 70. In addition, the damper pins 72 contact the sidewalls defining the damping passage 60, which also provides damping.

One or more damper stacks 70 may be disposed within a damping passage 60. In some embodiments, as illustrated in FIGS. 3 through 5, only a single damper stack 70 is disposed in a damping passage 60. In other embodiments, as illustrated in FIG. 6, a plurality of damper stacks 70 may be disposed in a damping passage 60. In the embodiment illustrated in FIG. 6, a static insert 64 is disposed between neighboring damper stacks 70 of the plurality of damper stacks 70, thereby partitioning the neighboring damper stacks 70 into individual passage segments.

Referring now to FIGS. 7 through 10, various embodiments of damper stacks 70 in accordance with the present disclosure are illustrated. As discussed, a damper stack 70 includes a plurality of damper pins 72. Each damper pin 72 has a length 73, which is defined between a first end 74 and a second end 76 of the damper pin 72. The damper pins 72 may be arranged in a length-wise linear array within a damping passage 60, such that the neighboring ends 74, 76 of neighboring damper pins 72 contact each other.

For example, the plurality of damper pins 72 may include a first damper pin 72' and a second damper pin 72", each of which extends between a first end 74 and a second end 76. The first end 74 of the first damper pin 72' may contact the second end 76 of the second damper pin 72". In some embodiments, the second end 76 of the first damper pin 72' may contact another neighboring damper pin 72, and/or the first end 74 of the second damper pin 72" may contact yet another neighboring damper pin 72.

As discussed, the contact between neighboring damper pins 72 may provide the primary damping mechanism for damping of the rotor blade 30. Centrifugal forces during operation cause the damper pins 72 to maintain such contact despite wearing. Accordingly, damper stacks 70 in accordance with the present disclosure advantageously continue to provide damping despite wearing during operation.

Figure 8:
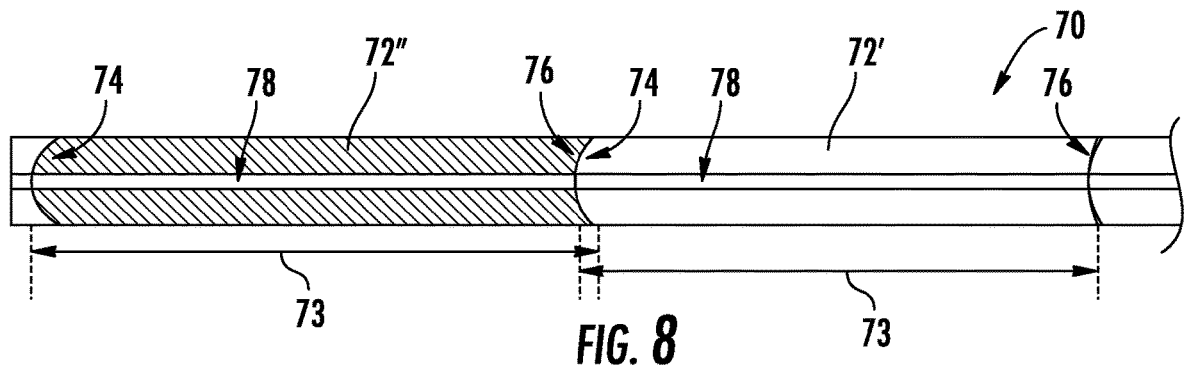
FIG. 8 is a cross-sectional view of a damper stack, in accordance with embodiments of the present disclosure.
Figure 9:
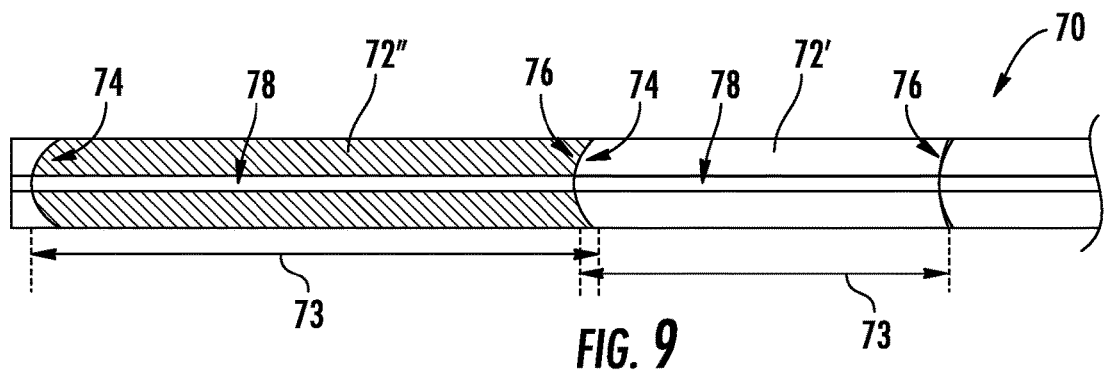
FIG. 9 is a cross-sectional view of a damper stack, in accordance with other embodiments of the present disclosure.
Figure 10:
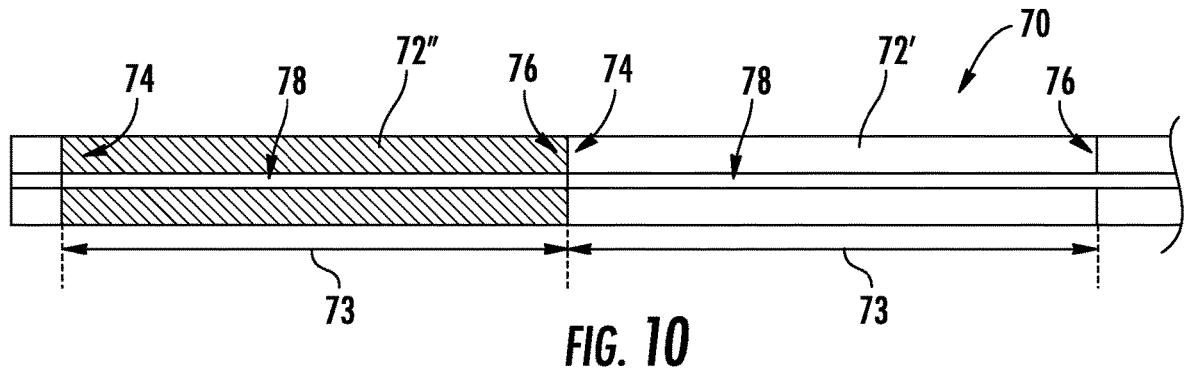
FIG. 10 is a cross-sectional view of a damper stack, in accordance with still other embodiments of the present disclosure.

The ends 74, 76 of the neighboring damper pins 72 may have suitable shapes, which provide such primary damping. In some embodiments, the neighboring ends 74, 76 of neighboring damper pins 72 may have complementary spherical shapes. For example, as illustrated in FIGS. 8 and 9, the first end 74 of the first damper pin 72' may have an outward (convex) spherical shape, and the second end 76 of the second damper pin 72" may have an inward (concave) spherical shape, or vice versa. In other embodiments, other suitable complementary shapes, such as conical, domed, etc., which provide suitable damping, may be utilized. In other embodiments, the neighboring ends 74, 76 of neighboring damper pins 72 may have mirrored shapes. For example, as illustrated in FIG. 10, the first end 74 of the first damper pin 72' and the second end 76 of the second damper pin 72" may be flat surfaces that abut against each other. Other suitable end 74, 76 shapes may be utilized, provided such shapes provide suitable primary damping.

Damper pins 72 may, in some embodiments as illustrated, have generally oval or round cross-sectional profiles. Alternatively, other suitably-shaped cross-sectional profiles may be utilized. The cross-sectional profile may be constant or may vary along the length 73 of the damper pin 72. Further, damper pins 72 may have any suitable cross-sectional sizes. Still further, damper pins 72 may be formed from any suitable materials. The shapes, sizes, and/or materials may be identical for the plurality of damper pins 72 in a damper stack 70 or may vary for one or more of the damper pins 72 within a damper stack 70.

As discussed, each of the plurality of damper pins 72 may have a length 73. In some embodiments, the lengths 73 of the damper pins 72 in a damper stack 70 may be identical. For example, as shown in FIGS. 8 and 10, the respective lengths 73 of the first and second damper pins 72', 72" may be identical. In other embodiments, as shown in FIG. 9, the lengths 73 of one or more damper pins 72 in a damper stack 70 may be different from other damper pins 72 in the stack. For example, as shown in FIG. 9, the length 73 of the first damper pin 72' may be different from the length 73 of the second damper pin 72".

As discussed, in some embodiments, the damping passage 60 is a cooling passage 54 (that is, a passage in fluid communication with a source of cooling medium, such as compressed air). Accordingly, in the illustrated embodiments, each of the plurality of damper pins 72 has a hollow cross-sectional profile, such that an internal passage 78 is defined through the damper pins 72 and damper stack 70. In these embodiments, cooling medium may flow through and/or around and past the damper stack 70. It should be understood, however, that the use of damper pins 72 and damper stacks 70 having hollow cross-sectional profiles is not limited to embodiments in which the damping passage 60 is a cooling passage 54. In other embodiments, such damper pins 72 and damper stacks 70 may be utilized in damping passages 60 that are separate and independent from the cooling passages 54. Further, in other embodiments, damper pins 72 and damper stacks 70 in accordance with the present disclosure may be solid, such that no internal passage is defined therethrough, and these solid damper pins 72 and damper stacks 70 may be utilized in damping passages 60 that are or are not cooling passages 54.

In some embodiments, a wire (not shown) may extend through one or more damper pins 72 of the damper stack 70. For example, the wire may extend through the internal passages 78 or through separately defined internal passages, thus leaving passages 78 empty. The wire may generally join the damper pins 72 together. In other embodiments, other suitable components may be utilized to join the damper pins 72 together, or the damper pins 72 may not be joined together.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A rotor blade for a turbomachine, the rotor blade comprising:
   a main body comprising a shank and an airfoil extending radially outwardly from the shank;
   a damping passage defined in the main body, the damping passage extending radially through the main body; and
   a damper stack disposed within the damping passage, the damper stack comprising a plurality of damper pins, each of the plurality of damper pins in contact with a neighboring damper pin, wherein each of the plurality of damper pins extends between a first end and a second end, and wherein the first end of a first damper pin of the plurality of damper pins defines a convex shape and the second end of a second damper pin of the plurality of damper pins defines a concave shape, the second end of the second damper pin mating with the first end of the first damper pin.

2. The rotor blade of claim 1, wherein each of the plurality of damper pins extends between the first end having the convex shape and the second end having the concave shape.

3. The rotor blade of claim 1, wherein the first end of the first damper pin has an outward spherical shape and the second end of the second damper pin has an inward spherical shape.

4. The rotor blade of claim 1, wherein a length of each of the plurality of damper pins is defined between the first end and the second end of the damper pin, and wherein the length of one of damper pins of the plurality of damper pins is different from the length of another of the damper pins of the plurality of damper pins.

5. The rotor blade of claim 1, wherein each of the plurality of damper pins has a hollow cross-sectional profile.

6. The rotor blade of claim 1, wherein the damper stack is a plurality of damper stacks, each of the plurality of damper stacks disposed within the damping passage.

7. The rotor blade of claim 6, further comprising a static insert disposed within the damping passage between neighboring damper stacks of the plurality of damper stacks.

8. The rotor blade of claim 1, wherein the damping passage extends radially through only a portion of the airfoil.

9. The rotor blade of claim 1, wherein the airfoil extends radially between a base and a tip, wherein the damping passage is defined through the tip, and wherein a plug is disposed within the damping passage at the tip.

10. A turbomachine, comprising:
    a compressor section;
    a combustor section;
    a turbine section;
    a plurality of rotor blades provided in at least one of the compressor section or the turbine section, each of the plurality of rotor blades comprising:
       a main body comprising a shank and an airfoil extending radially outwardly from the shank;
       a damping passage defined in the main body, the damping passage extending radially through the main body; and
       a damper stack disposed within the damping passage, the damper stack comprising a plurality of damper pins, each of the plurality of damper pins in contact with a neighboring damper pin, wherein each of the plurality of damper pins extends between a first end and a second end, and wherein the first end of a first damper pin of the plurality of damper pins defines a convex shape and the second end of a second damper pin of the plurality of damper pins defines a concave shape, the second end of the second damper pin mating with the first end of the first damper pin.

11. The turbomachine of claim 10, wherein each of the plurality of damper pins extends between the first end having the convex shape and the second end having the concave shape.

12. The turbomachine of claim 10, wherein the first end of the first damper pin has an outward spherical shape and the second end of the second damper pin has an inward spherical shape.

13. The turbomachine of claim 10, wherein a length of each of the plurality of damper pins is defined between the first end and the second end of the damper pin, and wherein the length of one of damper pins of the plurality of damper pins is different from the length of another of the damper pins of the plurality of damper pins.

14. The turbomachine of claim 10, wherein each of the plurality of damper pins has a hollow cross-sectional profile.

15. The turbomachine of claim 10, wherein the damper stack is a plurality of damper stacks, each of the plurality of damper stacks disposed within the damping passage.

16. The turbomachine of claim 15, further comprising a static insert disposed within the damping passage between neighboring damper stacks of the plurality of damper stacks.

17. The turbomachine of claim 10, wherein the damping passage extends radially through only a portion of the airfoil.

18. The turbomachine of claim 10, wherein the airfoil extends radially between a base and a tip, wherein the damping passage is defined through the tip, and wherein a plug is disposed within the damping passage at the tip.

19. The turbomachine of claim 10, wherein the plurality of rotor blades are provided in the turbine section.

20. The turbomachine of claim 10, wherein the turbomachine is a gas turbine.

* * * * *